No. 662,516. Patented Nov. 27, 1900.
H. H. BARKLAGE.
PROCESS OF FILLING INTERSTICES OF COB PIPES.
(Application filed May 9, 1900.)
(No Model.)
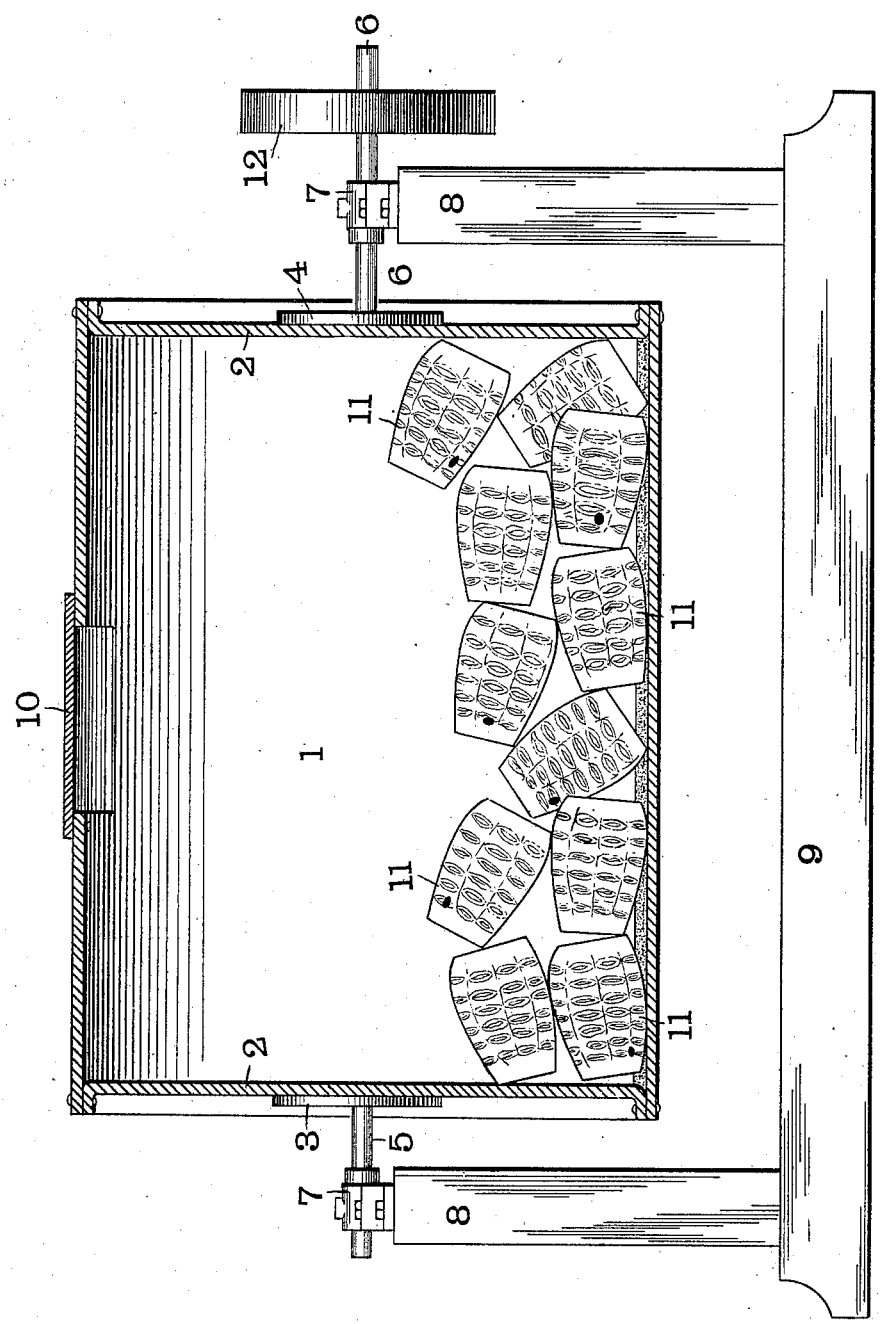
Witnesses
W. H. Alexander
Jessie R. Watkins
Inventor
H. H. Barklage
By Attorneys
Fowler & Fowler.

UNITED STATES PATENT OFFICE.

HERMANN H. BARKLAGE, OF ST. CHARLES, MISSOURI.

PROCESS OF FILLING INTERSTICES OF COB PIPES.

SPECIFICATION forming part of Letters Patent No. 662,516, dated November 27, 1900.

Application filed May 9, 1900. Serial No. 16,020. (No specimens.)

*To all whom it may concern:*

Be it known that I, HERMANN H. BARKLAGE, a citizen of the United States, residing at St. Charles, in the State of Missouri, have invented a certain new and useful Process of Filling the Interstices of Cob Pipes, of which the following is such a full, clear, and exact description as will enable any one skilled in the art to which it appertains to make and use the same, reference being had to the accompanying drawing, forming part of this specification.

Cob pipes are made by filling the interstices of the cob after it has been turned in the shape of a pipe with plastic material, such as plaster-of-paris, after which the surface is polished and finished by the application of a suitable varnish. Heretofore the interstices have been filled by applying to the periphery of the pipe-form a coating of plaster-of-paris mixed with water and then allowing the form to dry, after which the superfluous material is removed. This process of coating the pipe to fill the interstices is carried on by hand, and is consequently slow and expensive. Another objection to the process is that it does not completely fill the interstices, owing to the lack of sufficient pressure to drive the filling in and the absence of any effectual means for dislodging the air contained in the interstices. The result is that in the finished pipe many of the interstices are unfilled or only partially filled and the ones that are filled are loosely filled. This detracts greatly both from the appearance and durability of the finished pipes. Still another objection to this process is that after drying the entire periphery of the pipe-form is covered with superfluous filling material. This involves not only the loss of a large amount of filling material, but, what is of more importance, the time and expense of removing the superfluous material.

One object of my invention is to provide a process by which the interstices of cob pipes may be completely and compactly filled and at the same time the superfluous material removed from the peripheries of the pipes.

Another object of my invention is to dispense with hand-labor in filling the interstices of the pipes and to make it possible to fill the interstices of a large number of pipes at one operation.

My invention consists in first spreading a thin layer of plastic material, such as plaster-of-paris and water, out of contact with the pipes and then bringing the peripheries of the pipe-forms into contact with this thin layer of plastic material and agitating the said pipe-forms until the air is driven out of their interstices and the interstices completely filled with the plastic material.

The accompanying drawing, which illustrates one form of apparatus for carrying out my invention, is a side view, partly in elevation and partly in section.

1 is a receptacle, preferably cylindrical in form, which is provided with heads 2. Secured to the heads 2 by means of disks 3 and 4 are trunnions 5 and 6, respectively. The trunnions 5 and 6 are journaled in bearings 7, secured to end frames 8, carried by a base 9. The receptacle 1 is provided with a water-tight door or lid 10, through which the cob pipes 11 are inserted. The receptacle 1 is rotated upon its trunnions 5 and 6 by any suitable means, such as a pulley or belt-wheel 12, secured to the trunnion 6.

In carrying out my invention a small quantity of fluid or semifluid filling material, such as plaster-of-paris and water, is first placed in the receptacle through the door 10. The receptacle is then rotated by means of the wheel 12 to distribute the filling material over the sides of the same. The pipes 11 are then placed in the receptacle and said receptacle again rotated. This dislodges the air from the interstices of the pipes, and the filling material flows in and fills the said interstices. In addition to this the rolling impact of the cobs against each other and against the walls of the receptacle drives the filling material compactly into the interstices of the said cobs. The attrition of the cobs against each other and against the walls of the receptacle removes practically all superfluous filling material from the peripheries of the said cobs, thus not only effecting a saving of the material, but also dispensing with the necessity of removing the superfluous material before polishing. The receptacle 1 is rotated until the air is entirely driven out of the interstices of the cobs and said interstices completely and compactly filled with the material. The cobs are then removed through the door 10 and after drying immediately polished and varnished in the usual manner.

As the receptacle in which the cobs are agitated can be made of any convenient size, a large number of cobs can be filled at one operation, thus effecting a great saving of time and expense. In addition to this the finished product is much superior to that produced by the prior process both in appearance and durability, owing to the complete and compact filling of the interstices.

The receptacle in which the pipes are agitated can be made any other convenient shape instead of cylindrical, and other means can be used to agitate the receptacle and contents, such as oscillating or reciprocating them, without departing from the spirit of my invention. However, I prefer to use the form of receptacle and mode of agitating the same above described owing to the simplicity and effectiveness of this construction and mode of operation.

Having fully described my invention, what I claim as new, and desire to secure by Letters Patent of the United States, is—

1. The process of filling the interstices of cob pipes, which consists in first distributing a plastic material in a thin layer out of contact with the pipes, and then agitating the pipes with their peripheries in contact with said layer of plastic material until the interstices of the pipes are filled.

2. The process of filling the interstices of cob pipes, which consists in first distributing a mixture of plaster-of-paris and water in a thin layer out of contact with the pipes and then agitating the pipes with their peripheries in contact with said layer of plaster-of-paris and water until the interstices of the pipes are filled.

In testimony whereof I have hereunto set my hand and affixed my seal in the presence of the two subscribing witnesses.

HERMANN H. BARKLAGE. [L. S.]

Witnesses:
FRANK HERRMAN,
MARTIN V. FOWLER.